United States Patent [19]
Marlowe et al.

[11] Patent Number: 5,867,552
[45] Date of Patent: Feb. 2, 1999

[54] ZIRCONIUM-BASED TWO-PHASE ALLOYS FOR HYDRIDE RESISTANT NUCLEAR REACTOR COMPONENTS

[75] Inventors: Mickey O. Marlowe; Elias Plaza-Meyer, both of Wilmington, N.C.

[73] Assignee: General Electric Company, Wilmington, N.C.

[21] Appl. No.: 508,800

[22] Filed: Jul. 28, 1995

[51] Int. Cl.$^6$ .................................................. G21C 3/07
[52] U.S. Cl. ...................... 376/457; 376/417; 376/900; 420/422
[58] Field of Search .................................. 376/414, 416, 376/417, 457, 900; 420/422; 148/421, 672

[56] References Cited

U.S. PATENT DOCUMENTS

| | | | |
|---|---|---|---|
| 3,261,682 | 7/1966 | Rosler | 376/457 |
| 3,775,823 | 12/1973 | Adolph et al. | 376/457 |
| 4,094,706 | 6/1978 | Schulson et al. | 376/457 |
| 4,659,545 | 4/1987 | Ferrari | 376/457 |
| 5,475,723 | 12/1995 | Marlowe | 376/457 |

OTHER PUBLICATIONS

IAEA–TECDOC–684, "Corrosion of zirconium alloys in nuclear power plants", International Atomic Energy Agency, pp. 50–52, Jan. 1993.

Erickson, W.H. and Hardie, D., "The Influence of Alloying Elements on the Terminal Solubility of Hydrogen in alpha Zirconium," Journal of Nuclear Materials, 13, 1964, pp. 254–262.

Wilkins, B.J. S., Wasylyshyn, A. "Diffusion of Hydrogen Up a Thermal Gradient," Journal of Nuclear Materials, 29, 1969, pp. 235–237.

Tashiro, K., Abstract of report entitled "Enhanced Hydrogen Diffusion and Removal Techniques by Electromigration", Ontario Hydro Reports No. MIC–90–06098, 1990.

*Primary Examiner*—Daniel D. Wasil
*Attorney, Agent, or Firm*—Beyer & Weaver, LLP

[57] ABSTRACT

Zirconium-based components for nuclear reactors are disclosed whereby a rare earth or other metal which preferentially concentrates hydrogen when in contact with zirconium is dispersed as a second phase throughout a zirconium-based matrix. The morphology and distribution of the two-phase material is controlled such that the second phase, internal hydrogen absorbing particles, are provided as spherical particles, randomly distributed, to minimize the effects of the occluded hydrogen.

15 Claims, 3 Drawing Sheets

ZIRCONIUM-BASED TWO-PHASE ALLOYS FOR HYDRIDE RESISTANT NUCLEAR REACTOR COMPONENTS

This invention relates to a zirconium material for structural elements used in nuclear reactors. More particularly, the invention relates to a zirconium alloy structures that resist formation of zirconium hydride platelets.

BACKGROUND OF THE INVENTION

Nuclear reactors generally use zirconium-based alloys for structural components of fuel assemblies in the reactor core, e.g. fuel cladding, end plugs, flow channels, and spacers. Zirconium and its alloys, under normal circumstances, are excellent structural material for these components because they have low neutron absorption cross sections and, at temperatures below about 350° C., are strong, ductile, extremely stable and relatively nonreactive in the presence of demineralized water or steam. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used alloys for cladding. Zircaloy-2 has on a weight basis about 1.2 to 1.7 percent tin; 0.13–0.20 percent iron; 0.06–0.15 percent chromium and 0.05 to 0.08 percent nickel. Zircaloy-4 has essentially no nickel and about 0.2% iron but is otherwise substantially similar to Zircaloy-2.

During normal service, these materials can pick up hydrogen resulting from the corrosion of the zirconium alloys in water or steam environments. As the hydrogen concentration of the material increases, its ductility decreases and thereby establishes conditions for potential damage to the fuel components. This effect is most pronounced at moderate temperatures, e.g. <200° C., as experienced by the fuel during reactor shutdown and fuel handling operations.

A particularly deleterious form of hydride embrittlement occurs in the interior of a fuel cladding when water enters through a breach in the cladding wall. The initial "primary defect" through which the water enters is not necessarily catastrophic, and the breached cladding can sometimes be used for a period of time. However, the damaged cladding is susceptible to localized hydriding and ensuing "secondary defects". Secondary defects can be much worse than their primary counterparts, often allowing release of large amounts of fission products and fuel material from erosion/corrosion of the fuel material.

Secondary defects likely form according to the following sequence of events. When the fuel rod is initially breached, the coolant water enters the tube and instantly flashes to steam. Some of the steam probably reacts with the zirconium on the inner surface of the cladding to give off hydrogen, some which is gaseous and some of which is absorbed by the zirconium. If unchecked, both the absorbed and gaseous hydrogen can lead to formation of zirconium hydride. However, the gaseous hydrogen is apparently directly responsible for the potentially catastrophic localized hydriding. When the hydrogen gas reaches a critical concentration at which it significantly displaces oxygen in the atmosphere (a condition sometimes referred to as oxygen starvation), large amounts of zirconium hydride will form locally on a bare zirconium (or zirconium alloy) surface, or a break in the thin oxide layer on the zirconium (or zirconium alloy) often appearing as a "blister" or "sunburst."

The directly absorbed hydrogen also damages zirconium components. However, it does so by forming brittle zirconium hydride platelets within the base metal matrix. The platelets generally form first on grain boundaries, and continue to grow with increasing hydrogen content until a continuous hydride phase at the grain boundaries is achieved. They preferentially form on the basal planes of alpha phase processed metals.

Various approaches have been taken to prevent the formation of zirconium hydride plates in structural elements for nuclear fuel applications. For example, yttrium and some other rare earth metals, when in intimate contact with zirconium, have been found to act as preferential sinks for hydrogen. A fuel rod design incorporating monolithic layers of yttrium provided as inner liners on a zirconium-based alloy tube, or as an internal cap on an end plug is described in German Auslegeschrift 19 03 009, published on Dec. 16, 1976. Unfortunately, any bare yttrium used in such tubes would likely corrode in the fuel core environment, thus degrading its usefulness in preventing hydride formation.

U.S. Pat. No. 4,659,545 (issued to Ferrari on Apr. 21, 1987) describes a similar design in which between 1–40 percent of a cladding inner surface area is coated with thin film nickel spots. This design supposedly provides multiple hydrogen entry regions (the nickel film spots) so as to distribute the hydrogen more uniformly over the inner surface of the cladding. Unfortunately, this design still allows formation of locally high hydrogen concentrations in the zirconium alloy matrix near the nickel spots. Thus, hydride platelets can still form in the cladding tube, albeit at separated regions.

U.S. Pat. 5,475,723 (Application No. 08/215,451, Attorney Docket No. 24-NT-05494/GENEP011, entitled "NUCLEAR FUEL CLADDING WITH HYDROGEN ABSORBING LINER", naming Marlowe as inventor, filed on Mar. 16, 1994, and assigned to the assignee hereof) describes an improved fuel cladding design having a hydrogen-absorbing zirconium-alloy inner liner. The zirconium alloy contains a matrix having a relatively high concentration of a hydrogen absorbing material such as nickel. Thus, hydrogen in a fuel rod is absorbed uniformly over the cladding interior. Although this design represents a significant advance over the prior art, it would still be desirable to have other designs in which hydrogen is prevented from reacting with the zirconium alloy matrix.

SUMMARY OF THE INVENTION

The present invention provides components of a nuclear fuel bundle which resist the deleterious effects of hydrogen absorption when exposed to coolant and/or hydrogen in a nuclear reactor environment. This is accomplished by providing a zirconium-based material including: (1) a first phase of zirconium or a zirconium alloy matrix; and (2) a second phase of a material which preferentially absorbs hydrogen and thereby prevents at least a fraction of the hydrogen from reacting with the first phase to form zirconium hydride. Preferably, the second phase is provided as generally spherical particles which are randomly distributed throughout the first phase. The second phase generally is more reactive toward hydrogen than the first phase. Most typically, the second phase includes an element having a free energy of hydride formation which is less than the free energy of zirconium hydride formation. Suitable elements for the second phase include yttrium, titanium, lithium, and calcium (preferably yttrium). Suitable components for use in the present invention include fuel element cladding, fuel element end plugs, spacers, tie rods, tie plates, flow channels, water rods, and control tubes.

In a specific embodiment, the invention provides a multilayer fuel cladding tube having the matrix and hydrogen absorbing phases as described above. In preferred embodiments, such cladding tube will include (1) a mechanically strong outer substrate having a zirconium alloy matrix, and (2) a compliant barrier layer inner region having a zirconium or lightly alloyed zirconium matrix. Either or both of the outer substrate and the barrier layer include a hydrogen absorbing phase dispersed throughout the zirconium (or zirconium alloy). In other preferred embodiments, the cladding further includes an oxidation resisting inner liner metallurgically bonded to the inner surface of a barrier layer.

In another aspect, the invention provides a method of making zirconium alloy nuclear fuel bundle components that resist the deleterious effects of the hydrogen absorption when used in a nuclear reactor environment. The resulting component has hydrogen absorbing particles distributed throughout a zirconium or zirconium-alloy matrix. The method includes the following steps: (a) heating a combination of at least zirconium and a hydrogen-absorbing element to a temperature at which the hydrogen-absorbing element exists as a second phase within a zirconium containing matrix; (b) allowing the combination to develop a two-phase morphology in which the hydrogen-absorbing element exists as randomly distributed, generally spherical particles within the zirconium containing matrix; and (c) cooling the combination from said two-phase region at a cooling rate sufficient to preserve the two-phase morphology. Ultimately, further processing is conducted to form a nuclear fuel bundle component via one or more steps that essentially preserve said two-phase morphology. In a preferred embodiment, between about 0.5 and 20 weight percent yttrium is combined with between about 80 and 99.5 weight percent zirconium or zirconium alloy. At some point in the process, the resulting mixture is heated to a temperature of between about 600° and 1350° C. for between about 1 and 300 minutes.

These and other features of the present invention will be presented in more detail in the following specification of the invention and the figures.

DESCRIPTION OF THE PREFERRED EMBODIMENTS
I. TWO-PHASE STRUCTURES OF NUCLEAR FUEL BUNDLE COMPONENTS

This invention provides nuclear reactor structural materials which resist hydrogen embrittlement by occluding hydrogen in a hydrogen absorbing second phase dispersed within a zirconium or zirconium alloy matrix (first phase). In general, the second phase includes an element which is preferentially reactive with hydrogen. That is, the second phase is chosen such that hydrogen is more reactive toward it than toward zirconium or a zirconium alloy. Thus, hydrogen absorbed by a nuclear reactor structural component diffuses through the matrix phase and ultimately reacts with the second phase material. Of course, some hydrogen will still react with the zirconium phase, but because the second phase has a greater reactivity toward hydrogen, more of the hydrogen reacts at the second phase, thus reducing the rate at which detrimental zirconium hydride platelets form. It is important that the hydrogen absorbing elements form a second phase, rather than merely being alloyed with zirconium in the matrix phase. This ensures that the hydrogen will be concentrated in the second phase and out of the matrix phase where it could still form zirconium hydride.

The structural elements which may advantageously be made from the two-phase materials of this invention can take many forms and have many uses within a nuclear reactor. Generally, they are any structural component exposed to the corrosive environment provided in the nuclear reactor core. Such elements include those zirconium alloy structures commonly found in nuclear fuel assemblies and shown in FIG. 1.

Figure 1:
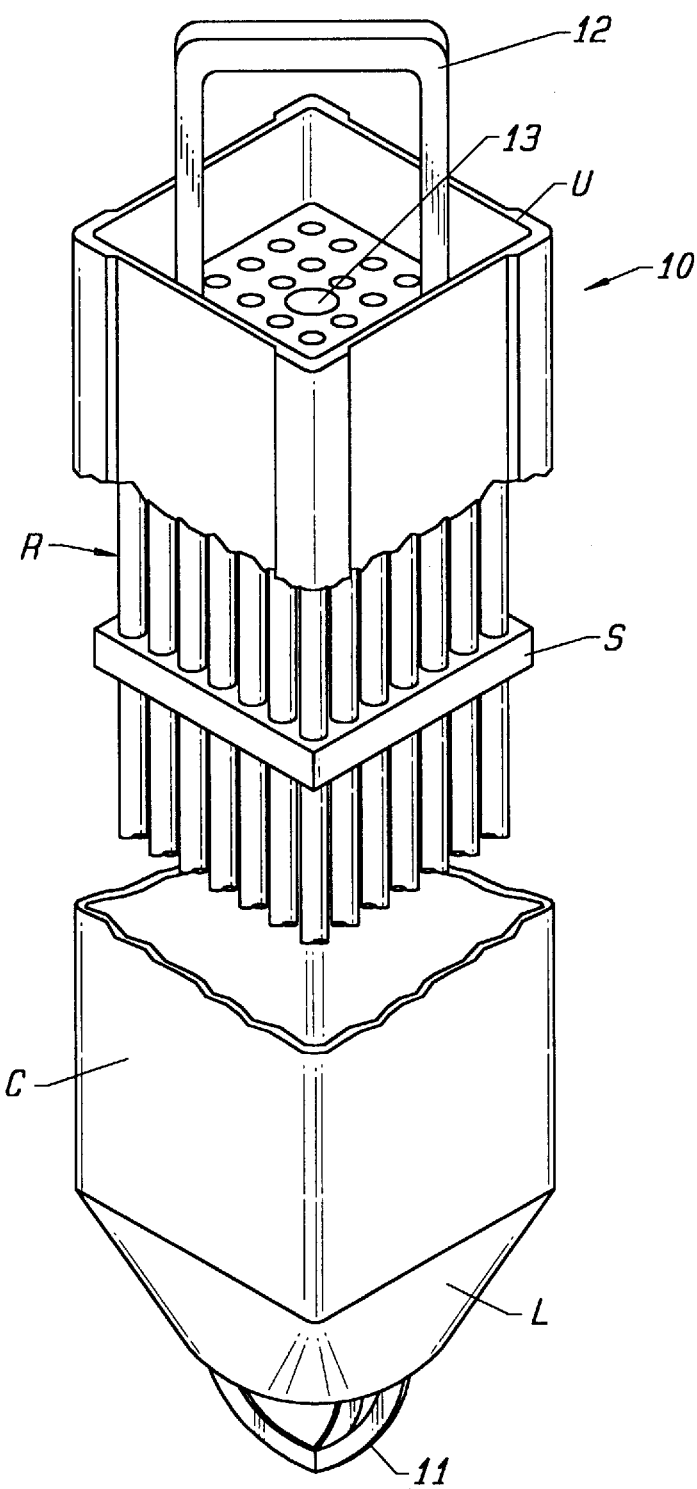
FIG. 1 is a partial cutaway perspective view of a nuclear fuel bundle containing a nuclear fuel rod.

FIG. 1 shows a cutaway sectional view of a nuclear fuel bundle or assembly 10 for a boiling water reactor ("BWR"). The fuel bundle 10 is a discrete unit of fuel containing many individual sealed fuel elements or rods R each containing a cladding tube and nuclear fuel. In addition, the fuel bundle consists of a flow channel C provided at its upper and with an upper lifting bale 12 and at its lower and with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serve to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

The bundle shown in FIG. 1 is provided as an example only, and it should be understood that the present invention can also be employed in pressurized water reactors ("PWRs") and "CANDU" reactors among others. Although PWR nuclear fuel bundles are similar in some regards to the BWR fuel bundles, there are some important differences. For example, there are no channels in the PWR fuel bundles. Further, there are more fuel rods—as many as 17×17 or 289—in the bundle array. In most other regards, PWR and BWR bundles are similar. For instance, both have lifting bales and tie plates. CANDU reactors—which are used in some Canadian reactors—have a somewhat different design, employing natural uranium dioxide in horizontally oriented cladding tubes and using heavy water as the moderator.

Figure 2:
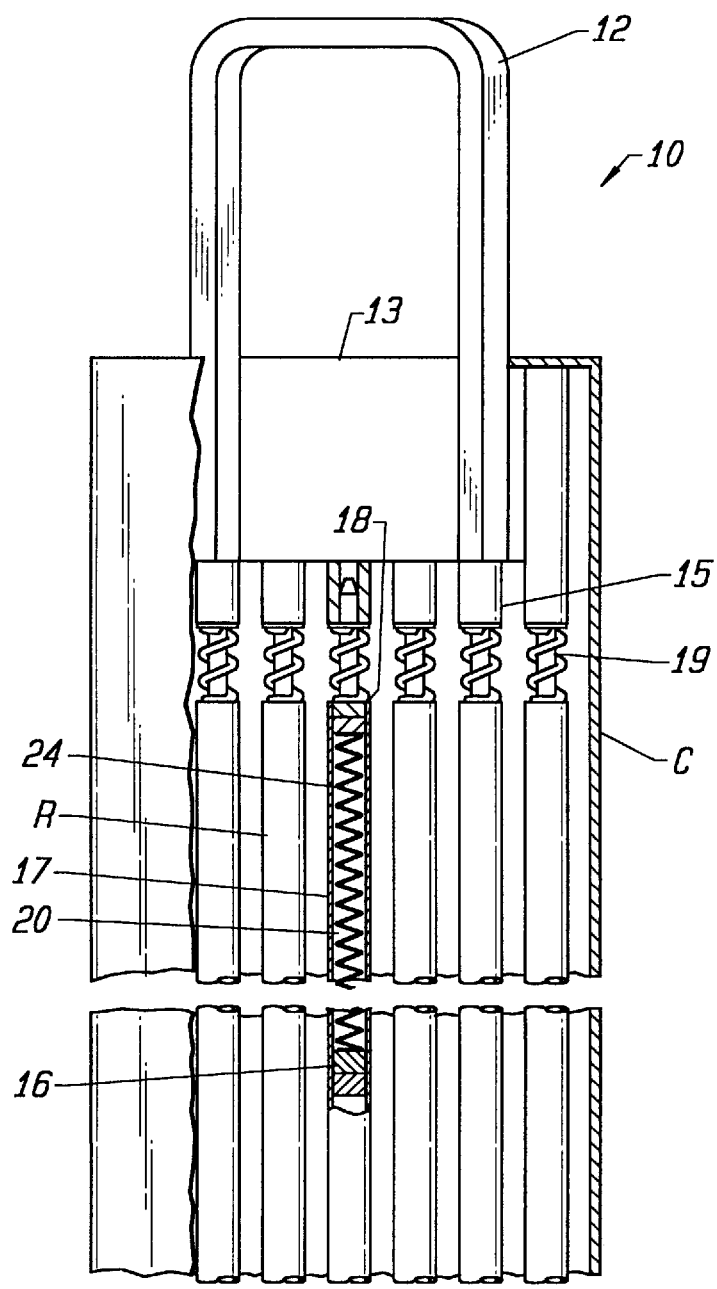
FIG. 2 is a partial cutaway sectional view of a nuclear fuel bundle showing the interior of a fuel rod.

Referring now to FIG. 2, the fuel elements or rods R are sealed at their ends by end plugs 18 welded to the fuel rod container 17, which may include studs 19 to facilitate the mounting of the fuel element in the fuel assembly. The fuel element is designed to provide excellent thermal contact between the fuel rod container 17 and the fuel material core, a minimum of parasitic neutron absorption, and resistance to bowing and vibration which is occasionally caused by flow of coolant at high velocity. The fuel material core is typically a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

A void space or plenum 20 is provided at one end of the element to permit longitudinal expansion of the fuel material 16 and accumulation of gases released by the fuel material. A getter (not shown) can be employed to remove hydrogenous impurities found in the fuel rod after manufacture. A nuclear fuel material retainer 24 in the form of a helical member is positioned within space 20 to provide restraint against axial movement of the pellet column during handling and transportation of the fuel element.

Figure 3:
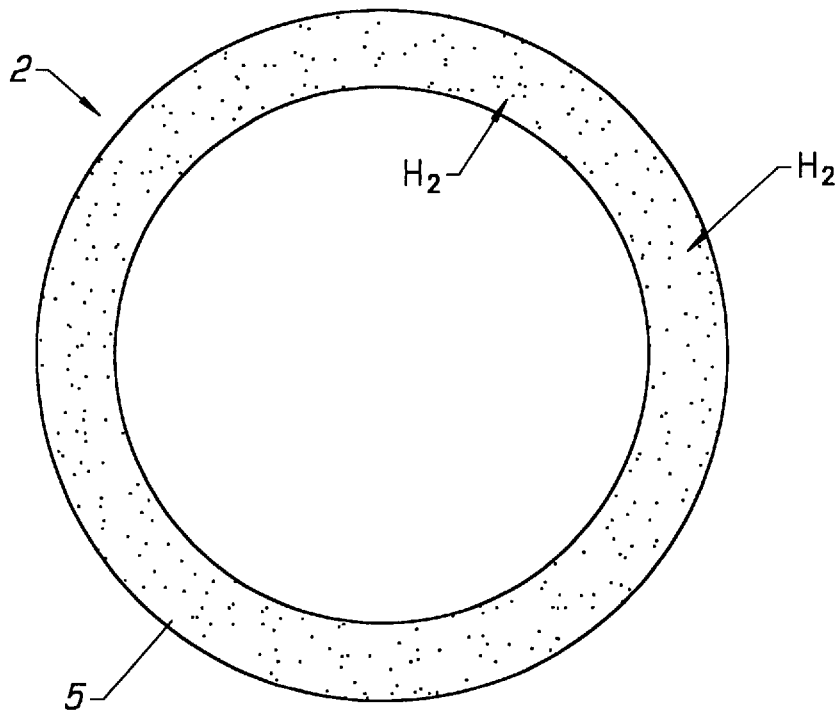
FIG. 3 is a cross-sectional view of a cladding tube of this invention.

Referring now to FIG. 3, a tubing cross section having a structure in accordance with the present invention is shown. As used herein, the term "tubing" refers to a metal tube having various uses, such as a container to enclose fuel pellets in a fuel rod (i.e., cladding). In any event, the tubing 2 is made from a two-phase material 5 including a zirconium or zirconium alloy matrix phase shown as white in the tubing cross-section and a hydrogen absorbing phase shown as black particles distributed throughout the white matrix phase in FIG. 3. The hydrogen absorbing particles provide a hydrogen sink which hinders available hydrogen from reacting with the zirconium alloy matrix phase.

The hydrogen absorbing phase may be formed from a variety of elements. In general, the elements should absorb hydrogen sufficiently strongly that the formation zirconium hydride platelets is significantly impeded. Usually this will mean that hydrogen is more reactive with the elements of the hydrogen absorbing particles than with the zirconium (in a thermodynamic sense). Thus, the hydrogen absorbing element should have a free energy of hydride formation that is lower than the free energy of zirconium hydride formation. In other words, the reaction

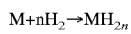

(where M is a hydrogen absorbing element in the second phase) should have a lower free energy than the reaction

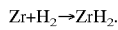

This simply means that there is a strong thermodynamic driving force to form sacrificial hydrides in the second phase. Because the available hydrogen will preferentially react with the second phase, it is less likely to form undesirable zirconium hydride platelets. Of course, the hydrogen absorbing elements should be chosen such that the kinetics of the particle-hydrogen reaction is sufficiently fast that hydrogen is actually removed from the matrix phase.

An important feature of this invention is that the particles of the preferential hydride forming material are discrete and should not be interlinked as in case of the hydride platelets that form in the usual zirconium or zirconium alloy material with the absorption of hydrogen. The result is a retention of the ductile nature of the material to permit higher total hydrogen concentration levels than for the usual zirconium or zirconium alloy material. Preferably, the particle phase includes one or more of the following elements: yttrium, titanium, calcium, and lithium. Yttrium is an especially preferred material for the second phase.

The cladding substrate is preferably made from a zirconium alloy. Most generally, suitable zirconium alloys have (1) corrosion resistance to boiling water reactor ("BWR") and/or pressurized water reactor ("PWR") coolant and (2) sufficient strength and ductility for use as fuel elements. Suitable zirconium alloys for the substrate preferably include at least about 98% zirconium, up to about 0.25% iron, up to about 0.1% nickel, up to about 0.25% chromium, and up to about 1.7% tin (all percents by weight). Other alloying elements may include niobium, bismuth, molybdenum, as well as various other elements used in the art.

In a preferred embodiment of this invention, the substrate is Zircaloy-2 or Zircaloy-4. In other preferred embodiments, "Zirlo"—a zirconium-based alloy containing about 1% tin, about 1% niobium, and less than about 0.2% iron—is employed. Other exemplary substrate alloys include zirconium/2.5% niobium, "NSF" alloys (about 1% tin, about 0.2–0.5% iron, about 0.05% nickel, about 0.6–1% niobium, and the balance zirconium), "Valloy" (about 0.1% iron, about 1.2% chromium, and the balance zirconium), other high chromium content alloys, and " Excel" or "Excellite" (about 0.3% niobium, about 0.3 molybdenum, about 1.2 to 1.5% tin, and the balance zirconium). Still other exemplary alloys include various bismuth-containing zirconium alloys such as those described in U.S. Pat. No. 4,876,064 issued to Taylor on Oct. 24, 1989. These alloys include, for example, (1) about 0.5 to 2.5 weight percent bismuth, (2) about 0.5 to 2.3 weight percent of a mixture of bismuth and tin plus about 0.5 to 1.0 weight percent of solute which may be niobium, molybdenum, tellurium, or mixtures thereof, or (3) about 0.5 to 2.5 weight percent of a mixture of tin and bismuth plus about 0.3 to 1.0 weight percent tellurium.

In the zirconium-based materials of this invention, the second phase particles should occupy at most about 20% of the total volume of the material. More preferably, the second phase particles should occupy between about 0.5 and 20% of the total volume of the material. By maintaining this relatively low volume of second phase particles, the mechanical strength and ductility of the material can be maintained. Of course, the maximum volume percent may vary somewhat depending upon the mechanical properties of the first and second phase elements.

The maximal weight percent of the chosen hydrogen absorbing element(s) in the entire two-phase material (matrix and hydrogen absorbing phases) will depend upon the composition of the matrix phase. If the hydrogen absorbing element(s) is quite soluble in the matrix phase, then a relatively high total weight percent of the second phase element will have to be used to attain a desired volume of second phase particles in the material. Preferably, the amount of the hydrogen absorbing element in the matrix phase is less than about 20 weight percent, and more preferably less than about 10 weight percent. One way to ensure that a low matrix concentration is attained is by using a particle phase element that is only slightly soluble in zirconium under the process conditions employed.

It is also important to control the morphology and distribution of particles in the matrix to maintain the mechanical strength of the nuclear fuel assembly components. Specifically, it is desirable that the particles have a primarily random distribution throughout the matrix phase. Further, it is desirable to that the particles have a generally spherical shape. In the processing section discussed below, a procedure will be to described for achieving the desired distribution and particle dimensions in the matrix phase.

In a preferred embodiment, a cladding tube of this invention has a two- or three-layer structure. Cladding often includes a pure (or dilutely alloyed) zirconium barrier layer metallurgically bonded to the inner surface of a Zircaloy tube (the substrate). The substrate provides the strength necessary to withstand the mechanical stresses induced in a nuclear reactor. The barrier layer provides the compliance necessary to combat the detrimental effects of a phenomenon known as pellet-cladding interaction. Pelletcladding interaction is caused by the interactions between the nuclear fuel, the cladding, and the fission products produced during the nuclear reaction. It has been found that this undesirable effect is due to localized mechanical stresses on the fuel cladding resulting from differential expansion and friction between the fuel and the cladding in coincidence with corrosive fission product species causing stress corrosion cracking. The pioneering work on zirconium barrier layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson, each of which is incorporated herein by reference for all purposes. Barrier layers have been found to effectively prevent damage to the cladding due to interaction with the pellet. In effect, the zirconium barrier deforms plastically to relieve pellet-induced stresses in the fuel element during swelling. It also inhibits stress corrosion cracking and protects the cladding from contact and reaction with impurities and fission products.

Two-layer cladding made in accordance with this invention will also include a pure or lightly alloyed zirconium barrier layer metallurgically bonded to the inner surface of a stronger zirconium alloy substrate. The barrier layer, as well as the substrate, will preferably include a second phase of hydrogen absorbing particles. Thus, hydrogen which is absorbed in either the substrate or the barrier layer will be preferentially occluded in the second phase. In alternative embodiments, either one of the substrate or the barrier layer does not include the hydrogen absorbing particles.

In another embodiment, the present invention provides a three-layer cladding including a substrate, a barrier, and, in addition, an inner liner. The substrate and the barrier layer may take the same form as described above. The inner liner matrix is preferably Zircaloy or another zirconium alloy. As explained in U.S. Pat. No. 5,341,407 (application Ser. No. 08/092,188) entitled INNER LINERS FOR FUEL CLADDING HAVING ZIRCONIUM BARRIER LAYERS, filed on Jul. 14, 1993, and incorporated herein by reference for all purposes, the inner liner protects the zirconium barrier layer from oxidation should water enter the cladding tube interior.

Figure 4:
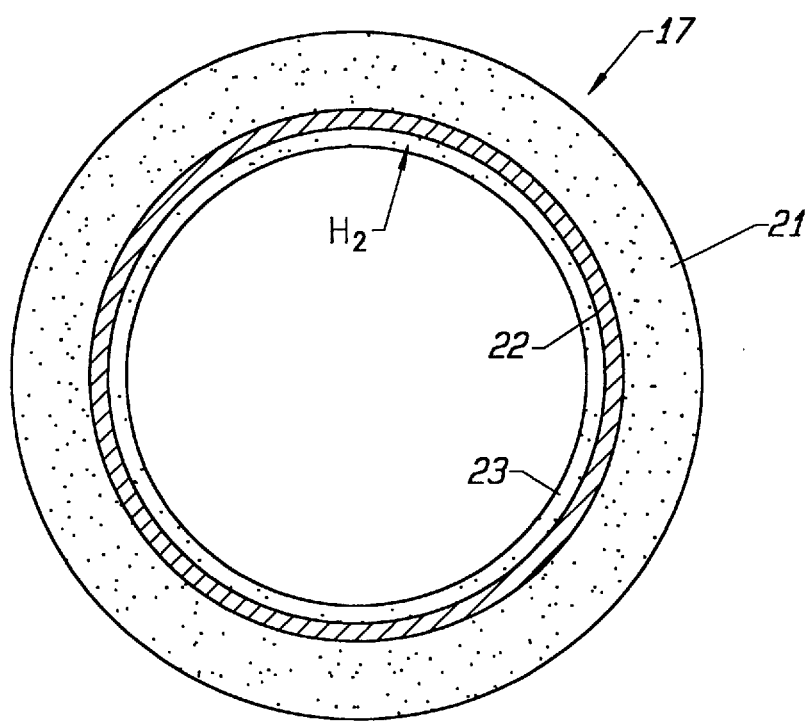
FIG. 4 is a cross-sectional view of a nuclear fuel element having a substrate, a barrier layer, and an inner liner in accordance with this invention.

Referring now to FIG. 4, a three-layer fuel cladding 17 in accordance with this invention includes a substrate 21, a zirconium barrier 22, and an inner layer or liner 23. The substrate forms the outer circumferential region of a cladding tube, the inner liner forms an inner circumferential region, and the zirconium barrier is located between the substrate and inner liner. Preferably, the inner liner 23 is corrosion resistant and contains a hydrogen absorbing particle phase, thereby reducing the risk of local oxygen starvation pockets and secondary hydride defects in the cladding wall.

The inner liner is the portion of the composite cladding closest to the nuclear fuel material. It protects the zirconium barrier from rapid oxidation should the fuel element interior come in contact with steam and, in this invention, it also hinders formation of secondary defects caused by local massive hydrides. The inner liner matrix phase should be a highly corrosion resistant material such as a zirconium alloy (e.g., a modified Zircaloy).

The cladding of this invention may have hydrogen absorbing particles located in only one of the cladding layers. For example, in a three layer structure, the hydrogen absorbing particles may be limited to the inner liner or substrate to counter the effects of hydrogen at the inner or outer walls, respectively. Further, the hydrogen absorbing particles may be limited to a region representing but a fraction of the total substrate thickness. For example, the hydrogen absorbing particles may be confined to a few micrometer layer on the inner or outer surface of the substrate.

II. MANUFACTURE OF THE TUBING

Various methods can be used to fabricate the two-phase components of this invention. Suitable methods should produce a two phase structure having generally spherical hydrogen absorbing particles randomly distributed throughout a zirconium alloy matrix. In general, the process involves a step of preparing a mixture of zirconium and a selected hydrogen absorbing element(s) that is to form the second phase. After initial melting of the zirconium or zirconium alloy containing the hydrogen absorbing second phase, the size and distribution of the second phase particles can be controlled by rapidly cooling from the liquid phase with subsequent heat treatments to grow the second phase particles to the desired size. The weight fractions of the mixture and the temperature of the heating step can be chosen from a phase diagram or other thermodynamic information. The heating step should be conducted for a period of time sufficient to allow the hydrogen absorbing phase to grow into generally spherical particles of the desired diameter.

A process for preparing cladding from a zirconium/yttrium mixture will now be described. An ingot of zirconium-yttrium or zirconium alloy-yttrium containing 4% by weight of yttrium is prepared by vacuum arc melting. Here it is to be understood that alloying elements, e.g. Sn, Fe, Cr, and Ni, may also be included in the alloy. Following melting, the ingot is reduced to a log approximately 9 inches in diameter by hot forging in the temperature range 800°–950° C. After hot forging, the log is machined to remove the oxidized outer surface and sectioned axially into billets of convenient length for extrusion, i.e., approximately 18 inches. The billets are heated into the temperature range 1150° to 1350° C., for a period of 5 to 300 minutes for homogenization of the alloy composition throughout the billet. The billet is then rapidly quenched in water to establish a fine distribution yttrium rich particles distributed throughout the zirconium or zirconium alloy matrix. Subsequent heating of the billet in the temperature range up to 1060° C. for times from a few seconds to several hours may be used to increase and control the size of the yttrium rich particles, and intermetallic precipitate particles in the zirconium-alloys.

Following the aging process for control of the size of the yttrium rich and other particles in the zirconium or zirconium alloy, the center of the billet is machined to form a hollow billet which is extruded at temperatures below 800° C. The extruded tube is then reduced to final tubing size by a series of cold tube reduction steps with intermediate annealings in the temperature range up to 650° C. The final reduction step is followed by a final annealing at a temperature selected to give either completely recrystallized final tubing or partially recrystallized tubing, depending on the desired mechanical properties and the application of the tubing.

To form a multi-layer cladding according to the present invention, a Zirconium alloy-yttrium tubeshell can be prepared as above and then bonded with zirconium sleeve and, if a three-layer cladding is to be formed, a Zircaloy inner sleeve before subsequent pilgering and annealing. Details of suitable processes can be found In U.S. Pat. No. 5,383,228 (application Ser. No. 08/091,672) filed on Jul. 14, 1993, naming Armijo, Rosenbaum, and Williams as inventors entitled METHOD FOR MAKING FUEL CLADDING HAVING ZIRCONIUM BARRIER LAYERS AND INNER LINERS, assigned to the assignee hereof, and incorporated herein by reference for all purposes.

III. CONCLUSION

Although the foregoing invention has been described in some detail for purposes of clarity of understanding, it will be apparent that certain changes and modifications may be practiced within the scope of the appended claims. For instance, although the specification has described processes for making yttrium-containing cladding, other hydrogen absorbing components can be made similar processes. For example, yttrium-containing tie rods also may be formed according to the processes of this invention. In addition, the reader will understand that the hydrogen-absorbing structure described herein can be used in environments outside of nuclear reactors. For example, the problem of hydride embrittlement occurs in other systems such as chemical reactors and heat transfer equipment.

What is claimed is:

1. A component of a nuclear fuel bundle which resists formation of zirconium hydride when exposed to hydrogen in a nuclear reactor environment, the nuclear fuel bundle component comprising:
    a first phase including zirconium or a zirconium alloy matrix; and
    a second phase distributed throughout the first phase, the second phase being substantially free of aluminum and zirconium, the second phase including particles which preferentially absorb hydrogen and thereby prevent at least a fraction of said hydrogen from reacting with the first phase.

2. The nuclear fuel bundle component of claim 1 wherein the component is one of a fuel element cladding, a fuel element end plug, a spacer, a tie rod, a tie plate, a lifting bale, and a flow channel.

3. The nuclear fuel bundle component of claim 1 wherein the component is a fuel rod cladding.

4. The nuclear fuel component of claim 1 wherein the second phase includes an element having a lower free energy of hydride formation than the free energy of zirconium hydride formation.

5. The nuclear fuel component of claim 1 wherein the second phase includes an element selected from the group consisting of yttrium, titanium, calcium, and lithium.

6. The nuclear fuel component of claim 1 wherein the second phase occupies no more than about 20 percent of the total volume of said component.

7. The nuclear fuel component of claim 1 wherein the second phase is distributed randomly throughout the first phase.

8. The nuclear fuel component of claim 1 wherein the second phase is provided as generally spherical particles distributed throughout the first phase.

9. The nuclear fuel bundle component of claim 1 wherein the second phase is elemental yttrium.

10. A cladding tube for housing fissionable material in a water cooled nuclear fission reactor, the cladding comprising:
    (a) a tubular matrix of zirconium or zirconium alloy having inner and outer surfaces; and
    (b) a second phase of generally spherical particles distributed randomly throughout the zirconium or zirconium alloy matrix, the second phase particles including an element which preferentially absorbs hydrogen and thereby prevent at least a fraction of hydrogen absorbed by the cladding tube from reacting with the zirconium or zirconium alloy matrix.

11. The cladding tube of claim 10 further comprising a fissionable material disposed within the inner surface of said tubular matrix.

12. The cladding tube of claim 10 wherein the particles which preferentially absorb hydrogen include one or more elements selected from the group consisting of yttrium, titanium, calcium, lithium, and combinations thereof.

13. The cladding tube of claim 10 further comprising a zirconium barrier layer having inner and outer surfaces, the outer surface being bonded to the matrix inner surface.

14. The cladding tube of claim 12 further comprising a zirconium alloy inner liner bonded to the inner surface of said barrier layer.

15. The cladding tube of claim 10 wherein the particles which preferentially adsorb hydrogen are elemental yttrium.

* * * * *